(12) United States Patent
Daujotas (10) Patent No.: US 10,574,346 B2
(45) Date of Patent: Feb. 25, 2020

(54) DIGITAL CAMERA ANALOG TRANSMISSION BAND STACKING INTO SINGLE WIRE

(71) Applicant: Connaught Electronics Ltd., Tuam, County Galway (IE)

(72) Inventor: Tomas Daujotas, Troy, MI (US)

(73) Assignee: Connaught Electronics Ltd., Tuam, County Galway (IE)

( * ) Notice: Subject to any disclaimer, the term of this patent is extended or adjusted under 35 U.S.C. 154(b) by 0 days.

(21) Appl. No.: 15/615,096

(22) Filed: Jun. 6, 2017

(65) Prior Publication Data

US 2018/0351638 A1     Dec. 6, 2018

(51) Int. Cl.
*H04B 7/26*     (2006.01)

(52) U.S. Cl.
CPC ............ *H04B 7/26* (2013.01); *B60R 2300/80* (2013.01); *B60R 2300/8066* (2013.01)

(58) Field of Classification Search
CPC ..... H04N 5/455; G01S 13/347; G01S 13/867; H04B 7/26; B60R 2300/80
See application file for complete search history.

(56) References Cited

U.S. PATENT DOCUMENTS

| | | | | |
|---|---|---|---|---|
| 5,901,151 A | * | 5/1999 | Bleiweiss | G06F 11/3034 370/200 |
| 7,567,154 B2 | * | 7/2009 | Elmore | H01P 3/10 333/21 R |
| 9,302,620 B2 | * | 4/2016 | Chuang | H04N 7/183 |
| 2005/0117664 A1 | * | 6/2005 | Adan | H03D 7/1441 375/316 |
| 2008/0036643 A1 | * | 2/2008 | Kiukkonen | G01S 19/29 342/21 |
| 2015/0210215 A1 | * | 7/2015 | Chuang | B60R 1/00 348/148 |
| 2015/0336521 A1 | * | 11/2015 | Tofilescu | B60R 16/023 382/104 |
| 2017/0187119 A1 | * | 6/2017 | Kirino | H01Q 1/2291 |
| 2018/0062888 A1 | * | 3/2018 | Johnson | H04B 1/0092 |

* cited by examiner

*Primary Examiner* — Kenny A Cese
(74) *Attorney, Agent, or Firm* — Osha Liang LLP (57) ABSTRACT

A communication assembly is disclosed. The communication assembly includes a radio frequency (RF) module configured to obtain RF data from an antenna of a vehicle, a camera module configured to obtain image data of a scene exterior to the vehicle, and a communication unit, operatively connected to the RF module and the camera module, configured to embed the RF data in a first frequency band of an analog signal, embed the image data in a second frequency band of the analog signal, and transmit, via a single physical medium communication link, the analog signal to a vehicle communication unit of the vehicle. The vehicle communication unit is configured to demodulate the analog signal to retrieve the RF data and the image data for providing, to an electronic control module (ECU) of the vehicle.

13 Claims, 5 Drawing Sheets

DIGITAL CAMERA ANALOG TRANSMISSION BAND STACKING INTO SINGLE WIRE

BACKGROUND

A vehicle may need to send and receive data by multiple wireless links. For example, a vehicle may need to receive global positioning signals from a satellite to provide a user, e.g., driver of a vehicle, with navigation information. Further, a vehicle may need to receive broadcast channels from a radio station to provide a user with access to radio stations.

Additionally, a vehicle may need to provide a user of the vehicle with situational awareness by video feeds. These video feeds may be recorded by cameras and displayed on a cabin display of the vehicle.

SUMMARY

In general, in one aspect, the invention relates to a communication assembly. The communication assembly includes a radio frequency (RF) module configured to obtain first RF data from a first antenna of a vehicle, a camera module configured to obtain image data of a scene exterior to the vehicle, and a communication unit, operatively connected to the RF module and the camera module, configured to embed the first RF data in a first frequency band of an analog signal, embed the image data in a second frequency band of the analog signal, and transmit, via a single physical medium communication link, the analog signal to a vehicle communication unit of the vehicle, wherein the vehicle communication unit is configured to demodulate the analog signal to retrieve the first RF data and the image data, and wherein the first RF data and the image data are provided, in response to the demodulating, to an electronic control module (ECU) of the vehicle.

In general, in one aspect, the invention relates to a communication system of a vehicle. The communication system includes (i) a first antenna, (ii) a radio frequency (RF) module configured to obtain first RF data from the first antenna, (iii) a camera module configured to obtain image data of a scene around the vehicle, (iv) a communication unit, operatively connected to the RF module and the camera module, configured to embed the first RF data in a first frequency band of an analog signal, embed the image data in a second frequency band of the analog signal, and send the analog signal to a vehicle communication unit of the vehicle, (v) a twisted pair of conducting wires coupling the communication unit and the vehicle communication unit, wherein the twisted pair of conduction wires is configured to transmit the analog signal based on differential signaling, and (vi) the vehicle communication unit configured to demodulate the analog signal to retrieve the first RF data and the image data, wherein the first RF data and the image data are provided, in response to the demodulating, to an electronic control module (ECU) of the vehicle.

In general, in one aspect, the invention relates to a method of communication for a vehicle. The method includes obtaining first RF data from a first antenna of the vehicle, obtaining, by a camera, image data of a scene around the vehicle, embedding the first RF data in a first frequency band of an analog signal, embedding the image data in a second frequency band of the analog signal, and transmitting, via a single physical medium of a communication link, the analog signal to a vehicle communication unit of the vehicle, wherein the vehicle communication unit is configured to demodulate the analog signal to retrieve the first RF data and the image data, and wherein the first RF data and the image data are provided, in response to the demodulating, to an electronic control module (ECU) of the vehicle.

Other aspects of the invention will be apparent from the following transaction description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a communication assembly. The communication assembly may be configured to be placed on a fuselage of a vehicle for wireless communication using radio frequency (RF) channels. The RF channels may include FM radio band, Sirius XM radio band, GSM, 4G LTE bands, V2V & V21 bands, etc. In one or more embodiments of the invention, the communication assembly includes a camera module that generates a video feed of an exterior of the vehicle to be displayed on a video display of the vehicle. For example, the video feed may include 16/8 bit YUV video data that is quadrature modulated with the analog RF channels into a single analog signal. The single analog signal may then be transmitted using a single coax cable or a single twisted pair of conducting wires. In an example, the camera video feed is combined with multiple antenna signals by applying a frequency stacking method, e.g., based on the quadrature modulation. As used herein, a frequency stack is an ordered collection of frequency bands. Accordingly, stacking (or frequency stacking) refers to arranging a signal into a particular frequency band.

Figure 1:
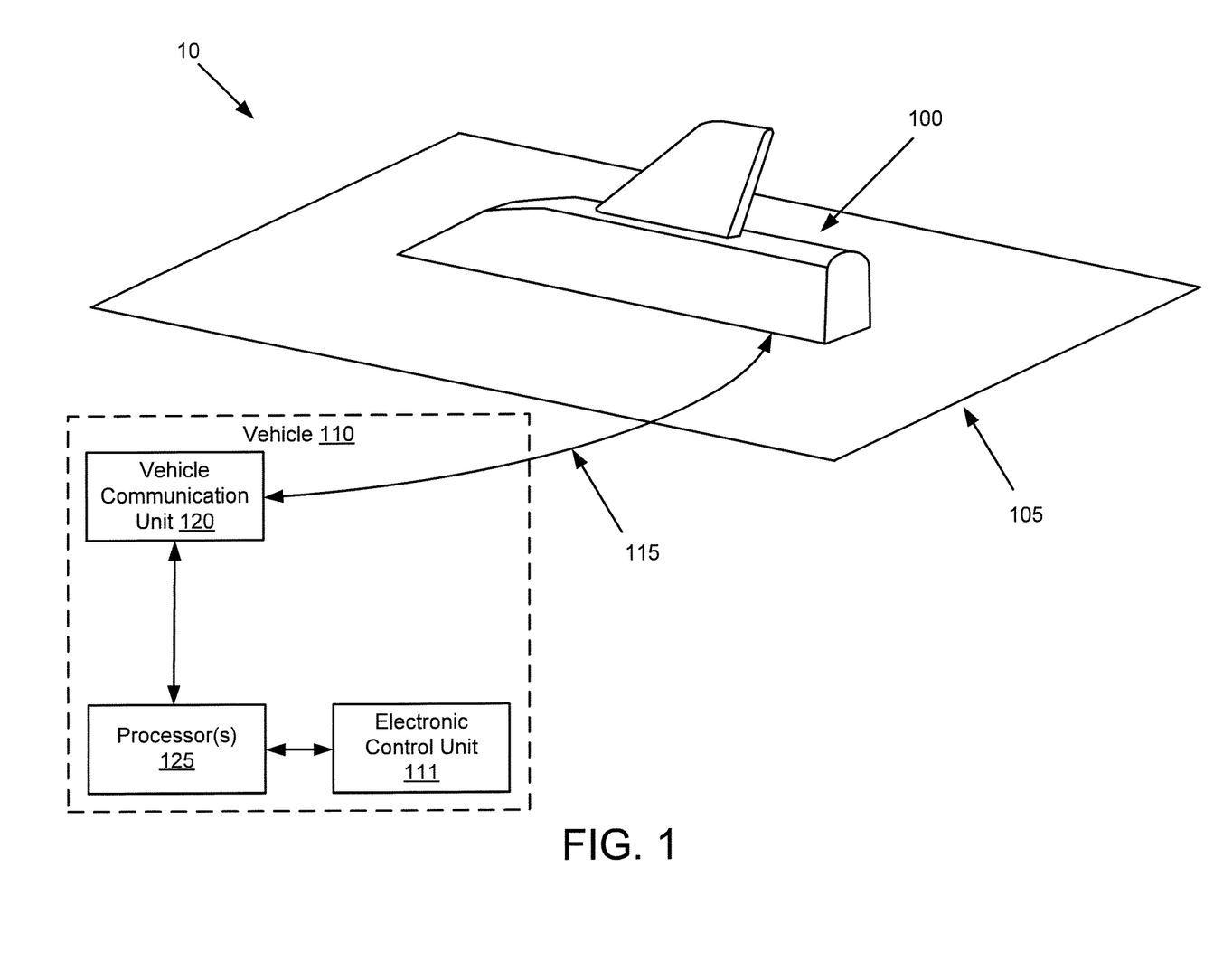
FIG. 1 shows a communication system in accordance with one or more embodiments of the invention.

FIG. 1 shows a communication system (10) in accordance with one or more embodiments of the invention. In one or more embodiments, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the communication system (10) may enable a vehicle (110) to send and/or receive data wirelessly and provide a user, e.g., driver, of the vehicle (110) with situational awareness of a surrounding of the vehicle (110). For example, the communication system (10) may provide a video feed of an exterior scene surrounding a vehicle (110) that may be displayed to a user/driver of the vehicle (110).

When the communication system (10) is operatively connected to a vehicle (110), the communication system (10) may be controlled by an electronic control unit (ECU) (111) of the vehicle (110). For example, the ECU (111) may send commands to the communication system (10) to turn components of the communication system (10) on or off, adjust control parameters of components of the communication system (10), or otherwise adjust the operation of the communication system (10). The ECU may include, in one or more embodiments, at least one processor and associated memory (not shown).

The communication system (10) may include a communication assembly (100), a vehicle communication unit (120), and one or more processors (125). Each of these components is described below.

The communication assembly (100) may be a physical device configured to be disposed on a fuselage (105) of a vehicle (110). The vehicle (110) may be, for example, an automobile, truck, boat, plane, or other mobile machine. More than one communication assembly (100) may be disposed on a vehicle without departing from the invention. In one or more embodiments, the communication assembly (100) may include at least one antenna and a camera module for capturing a scene exterior to the vehicle (110).

Figure 4:
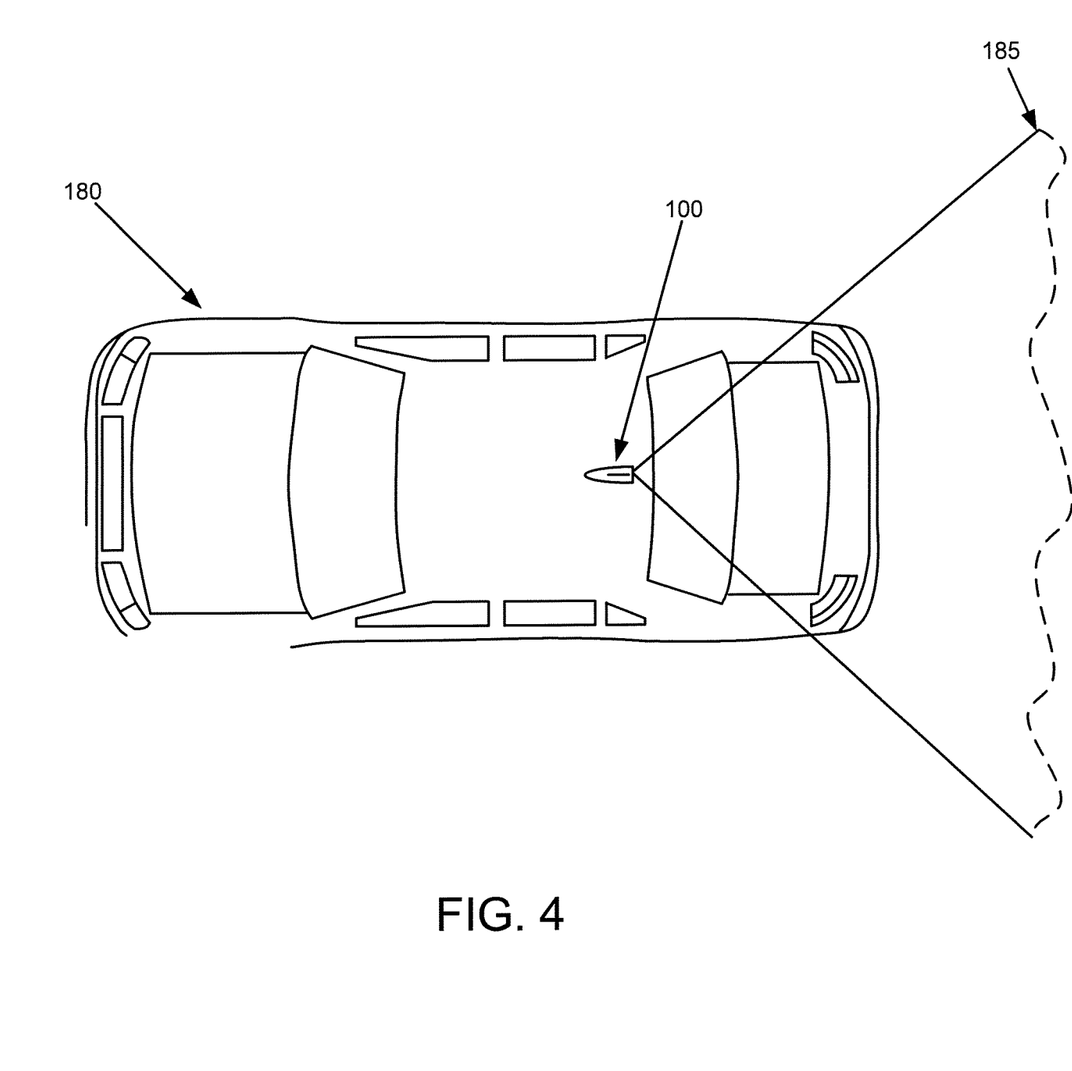
FIGS. 4 and 5 show examples in accordance with one or more embodiments of the invention.

When disposed on a roof of a vehicle, a camera of the communication assembly (100) may be configured to capture a 130° rearview, a 130° sideview, a 130° front view, or any combination of the aforementioned views. In one or more embodiments of the invention, the view angle may be 190° in each of the aforementioned views without departing from the scope of the invention. For example, FIG. 4 shows a diagram of an example of a communication assembly (100) disposed on a roof of a vehicle (180) including a camera configured to capture a 60° rear view (185). The camera may capture other view angles without departing from the invention.

In one or more embodiments of the invention, multiple communication assemblies (100) may be disposed on a fuselage of a vehicle. Each of the communication assemblies (100) may include a camera that generates a view. Due to the placement of each communication assembly (100) and the orientation and type of the camera of each communication assembly (100), each communication assembly may provide a different view. Each of the views provided by each of the communication assemblies (100) may be integrated to form a composite view. In one or more embodiments of the invention, the composite view may include a larger view any than any of the views incorporated into the composite view. In one or more embodiments of the invention, the composite view may include a higher resolution view any than any of the views incorporated into the larger view. In one or more embodiments of the invention, the composite view may include a separate area that highlights an important subview related to a vehicle maneuver and a general area that shows an external view from the vehicle. In one or more embodiments of the invention, the composite view may be a zoomed view of a scene exterior to the vehicle that is set on the basis of a sensor measurement by the vehicle. In one or more embodiments of the invention, the composite view may include a view that would otherwise be occluded from the view of the driver by, for example, the roof or a support structure of the vehicle.

Continuing with FIG. 1, the communication assembly (100) may include electronic components for sending and receiving data wirelessly and/or generating image data or a video of a scene around the vehicle. These electronic components will be described in greater detail in FIG. 2.

The communication system (10) may include one or more processors (125). The processors (125) may be physical devices such as circuits. The processors (125) may be operatively connected to the electronic control system (111) of the vehicle (110). In one or more embodiments of the invention, the processors (125) may be digital signal processors, application specific integrated circuits, and/or other monolithic hardware. In one or more embodiments of the invention, the processors (125) may be general purpose central processing units executing instructions stored on a non-transitory storage that cause the general purpose central processing units to process the data and/or video feeds generated by the communication assembly (100).

In one or more embodiments of the invention, the processors (125) are located at a different location than the communication assembly (100). For example, the processors (125) may be located in an interior of the vehicle (110) while the communication assembly (100) is located on the fuselage (105) of the vehicle.

The processors (125) may communicate with the communication assembly (100) by a vehicle communication unit (120) operatively connected to the communication assembly (100) by a communication link (115). The communication link (115) may be a wired or wireless connection that enables the exchange of data between the communication assembly (110) and the vehicle communication unit (120). The communication link (115) may be a network connection and data sent via the communication link (115) may be forwarded by multiple devices before reaching a destination without departing from the invention.

The vehicle communication unit (120) may be an analog and/or a digital communications processor. The vehicle communication unit (120) may be configured to perform the functions described below.

In one or more embodiments of the invention, the vehicle communication unit (120) may be a point-to-point communication processor such as a low-voltage differential signaling serializer or a modulator that sends and receives data via the communication link (115). For example, the vehicle communication unit (120) may receive data from the processor(s) (125). The vehicle communication unit (120) may serialize the data received from the processor(s) (125) and send the data to the communication assembly (100) via the communication link (115). Similarly, the vehicle communication unit (120) may receive data in a serial format from the communication assembly (100) via the communication link (115). The vehicle communication unit (120) may parallelize the received data and send it to the processor(s) (125).

In one or more embodiments of the invention, the vehicle communication unit (120) may include signal modulating and demodulating functionalities that sends and receives analog signals via the communication link (115). For example, the vehicle communication unit (120) may receive data from the processor(s) (125) and generates a modulated analog signal based on the received data. The vehicle communication unit (120) may send the modulated analog signal to the communication assembly (100) via the communication link (115). Similarly, the vehicle communication unit (120) may receive a modulated analog signal from the communication assembly (100) via the communication link (115). The vehicle communication unit (120) may extract data from the modulated analog signal and send it to the processor(s) (125).

Figure 2:
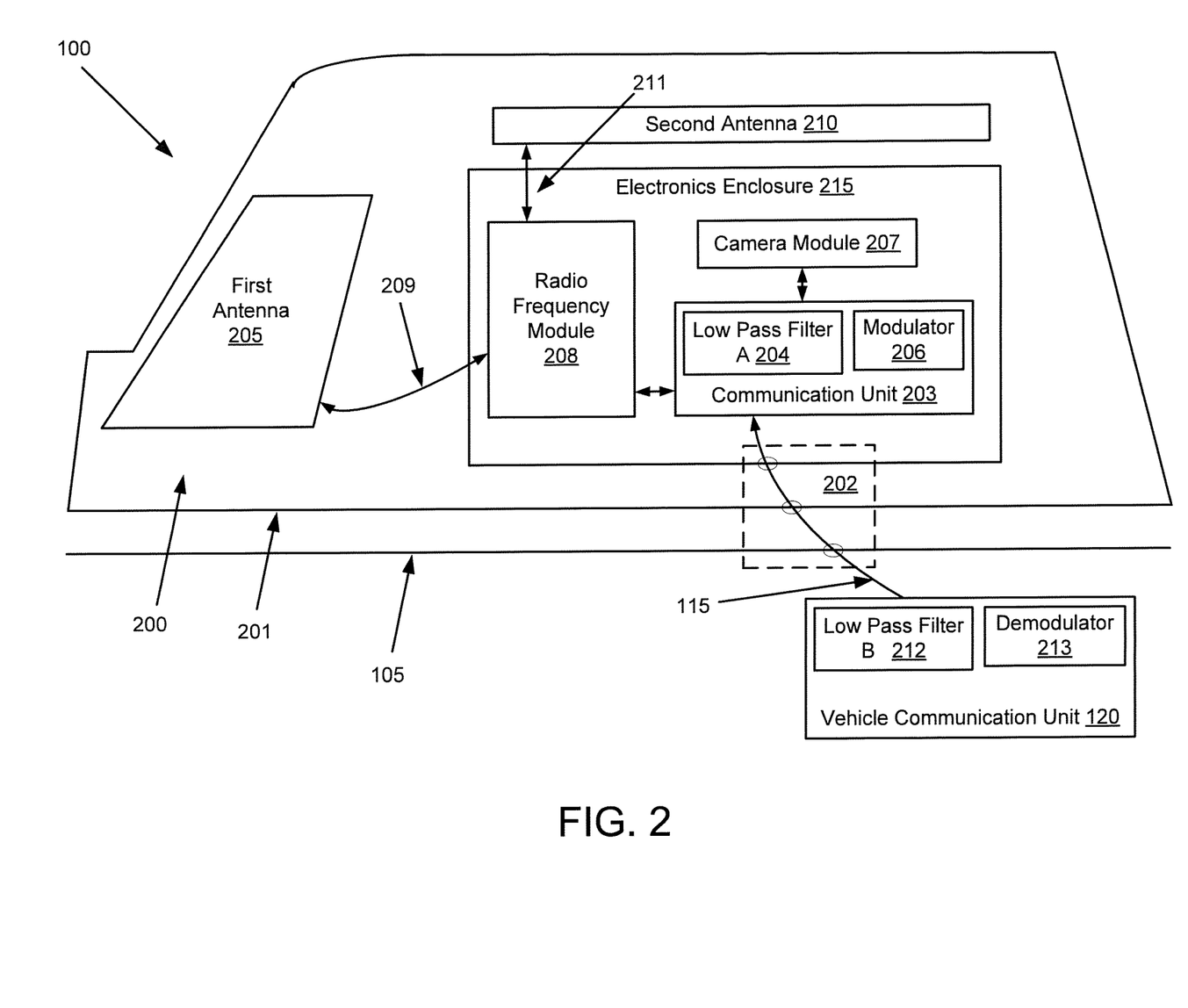
FIG. 2 shows a schematic diagram of a communication system in accordance with one or more embodiments of the invention.

FIG. 2 shows a schematic diagram depicting further details of the communication assembly (100) and the vehicle communication unit (120) of the communication system (10) in accordance with one or more embodiments of the invention. In one or more embodiments, one or more of the modules and elements shown in FIG. 2 may be omitted, repeated, and/or substituted. Accordingly, embodiments of the invention should not be considered limited to the specific arrangements of modules shown in FIG. 2.

As shown in FIG. 2, the communications assembly (100) may include a housing (200), a first antenna (205), a second antenna (210), and an electronics enclosure (215). Each of these components is described below.

The housing (200) may be a physical structure that houses the first antenna (205), second antenna (210), and electronics enclosure (215). The housing (200) may be at least partially hollow to accommodate the electronics enclosure (215) and antennas (205, 210). The exterior shape of the housing (200) may be in the form of a sharkfin to minimize air resistance caused by the housing (200). For example, the sharkfin shape may limit drag generation by the housing (200) when air passes from left to right. One of ordinary skill in the art will appreciate that the housing (200) may have a different shape without departing from the invention.

The exterior of the housing (200) may have a bottom (201) configured to be disposed on the fuselage (105) of a vehicle. The bottom (201) may be conformal to the fuselage of the vehicle to maximize the contact area of the bottom (201) and the fuselage (105) of the vehicle. The bottom (201) may transmit heat to the fuselage (105) of the vehicle which may improve the performance of electronic devices disposed within the housing.

To support wireless communications, a first antenna (205) and second antenna (210) may be disposed within the housing (200). The antennas may be operatively connected to electronics contained in the electronics enclosure (215). Electronics contained in the electronics enclosure (215) may apply voltages to the first antenna (200) and/or second antenna (210).

The first antenna (205) may be a physical device configured to radiate electromagnetic radiation in response to an applied voltage having a first frequency. The first antenna may be a monopole-type antenna including a printed circuit board having at least one conducting patch. The printed circuit board may be orthogonal to the bottom (201) of the housing (200). In one or more embodiments of the invention, the first antenna may use the bottom (201) of the housing as a ground plane. In one or more embodiments of the invention, the first antenna may utilize the fuselage (105) of a vehicle as a ground plane. The size and shape of the at least one conducting patch may be proportional to a wavelength associated with the first frequency of the applied voltage. In response to the applied voltage, the first antenna (205) may radiate vertically polarized radiation due to the first antenna (205) being a monopole-type antenna. For example, with respect to FIG. 2, the electromagnetic radiation radiated by the first antenna may be polarized perpendicularly to the bottom (201) of the housing (200).

The second antenna (210) may be a physical device configured to radiate electromagnetic radiation in response to an applied voltage having a second frequency. The second antenna may be a planar-type antenna including a printed circuit board having at least one conducting patch. The second antenna may be, for example, a patch antenna or a planar inverted-F antenna. The second antenna may be disposed on the electronics enclosure (215). In one or more embodiments of the invention, the second antenna may use the electronics enclosure (105) as a ground plane. The size and shape of the at least one conducting patch may be proportional to a wavelength associated with the second frequency of the applied voltage. In response to the applied voltage, the second antenna may radiate horizontally polarized radiation due to the second antenna being a planar-type antenna. For example, with respect to FIG. 2, the electromagnetic radiation radiated by the first antenna may be polarized parallel to the bottom (201) of the housing (200).

While the first antenna (205) and second antenna (210) have been described as metallic structures, one of ordinary skill in the art will appreciate that an antenna structure may include and/or be comprised of non-metallic materials. An antenna may include semiconducting or insulating materials without departing from the invention. The non-metallic materials perform different functions than metallic materials such as, for example, absorbing radiation but also may perform the same function as metallic materials such as, for example, transmitting, directing, and/or radiating electromagnetic radiation without departing from the invention.

The electronics enclosure (215) may be a mechanical structure configured to house electronic devices, such as the camera module (207), the radio frequency module (208), and the communication unit (203). Each of these components is described below.

The camera module (207) may be an electronic device configured to generate image data of a scene (i.e., a view) exterior of the vehicle. The image data is a collection of data items that represents a static image (i.e., picture) or a moving image (i.e., video) of the scene. As used herein, the image data representing a moving image is referred to as a video feed. In one or more embodiments, the video feed is based on an analog video signal format, such as composite video, S-video, component video, etc. In one or more embodiments, the video feed includes a continuous stream of digital data.

The camera module (207) may include a circuit board including a number of traces and circuit components. For example, the camera module (207) may be a digital camera, video sensor, a CMOS imaging array, or other charge coupled device (CCD). The scene captured by the camera module (207) may be a rearward view depicting the exterior scene behind a vehicle. The scene captured by the camera module (207) may be a forward view depicting the exterior scene in front of a vehicle. The scene captured by the camera module (207) may be a side view depicting a location around that driver that would not be otherwise visible to the driver, e.g., a blind spot. The scene captured by the camera module (207) may be equivalent to that provided by a rearview mirror disposed on a windshield of a vehicle.

The camera module (207) may be configured to operate under the direction of an electronic control unit (ECU (111), FIG. 1) of a vehicle (110, FIG. 1). For example, the ECU may send commands to the camera module (207) that cause the camera module (207) to turn on, off, and/or generate a video feed. The camera module (207) may act as an alert sensor for the ECU and thereby cause the vehicle to take an action based on a video feed generated by the camera module (207).

When generating a video feed (and/or capturing image data), the camera module (207) may be configured to send the generated video feed (or image data) to the processors (125, FIG. 1). The processors (125, FIG. 1) may analyze the video feed in real-time, add annotations such as distance indicators to the video feed, and forward the video feed to the electronic control unit (111, FIG. 1) of the vehicle (110, FIG. 1) for display to a user.

Thus, the camera module (207) may improve the situational awareness of a user of the vehicle (110, FIG. 1) by enabling the user to see scenes surrounding the vehicle while normally operating the vehicle that may otherwise be unavailable to the user of the vehicle (110, FIG. 1).

The radio frequency module (208) may be an electronic device configured to send and/or receive radio frequency data (RF data) wirelessly. To send/or receive RF data, the radio frequency module (208) may be connected to the first antenna (205) by a first radio frequency feed (209) and connected to the second antenna (210) by a second radio frequency feed (211). Each feed may be a shielded connection that prevents the transmission of electromagnetic interference. The radio frequency module (208) may be configured to perform the functions shown in FIG. 9.

The communication unit (203) may be an analog and/or a digital communications processor and may be operatively connected to the camera module (207), the radio frequency module (208), and the vehicle communication processor (120). In one or more embodiments of the invention, the communication unit (203) may be a point-to-point communication processor such as a low-voltage differential signaling serializer or a modulator that sends and receives data via the communication link (115). For example, the communication unit (203) may receive RF data from the radio frequency module (208) and/or image data from the camera module (207). The communication unit (203) may serialize the data and send the data to the vehicle communication unit (120) via the communication link (115). Similarly, the communication unit (120) may receive data in a serial format from the vehicle communication unit (120) via the communication link (115). The communication unit (305) may parallelize the received data and send it to the radio frequency module (208) and/or the camera module (207).

In one or more embodiments of the invention, the communication unit (203) is configured to embed or stack RF data from the first antenna (205) in a first frequency band of an analog signal, and embed or stack image data from the camera module (207) in a second frequency band of the analog signal. In one or more embodiments, the communication unit (203) is further configured to embed RF data from the second antenna (210) in a third frequency band of the analog signal. In one or more embodiments, the communication unit (203) may include a low pass filter A (204) and a modulator (206) that are configured to embed the image data from the camera module (207) in the second frequency band of the analog signal. As used herein, a frequency band is an interval in the frequency domain that is delimited by a lower frequency and an upper frequency, or delimited by a frequency band.

In one or more embodiments, the RF data from the first antenna (205) includes a modulated carrier signal in the first frequency band. Similarly, the RF data from the second antenna (210) includes a modulated carrier signal in the third frequency band. In one or more embodiments, the first frequency band and/or the third frequency band correspond to a radio band, a GSM (global system for mobile communication) frequency band, an LTE (long term evolution) frequency band, etc. In one or more embodiments, the image data includes an analog video signal in the second frequency band. In one or more embodiments, the image data includes a continuous stream of digital data that modulates (e.g., using the modulator (206)) the analog signal in the second frequency band. In one or more embodiments, the second frequency band corresponds to the based band, which is a frequency band having a zero or near-zero (e.g., less than 100 hz) lower frequency. In one or more embodiments, modulation is used to collectively embed the image data and the RF data in the analog signal. For example, the analog signal may be generated by combining the image data and one or more RF data using the quadrature modulation. The quadrature modulation is the technique of combining two or more amplitude-modulated carrier signals in such a way that the original amplitude modulations are separable, by coherent demodulation, at the receiver. In one or more embodiments, the analog base band video signal of the image data and one or more modulated carrier signal of the RF data are combined into the analog signal using the quadrature modulation. In other examples, frequency modulation, orthogonal type modulation, or other modulations may be used to combine the image data and one or more RF data into the analog signal. In one or more embodiments, a low pass filter (e.g., low pass filter A (204)) is applied to the analog base band video signal of the image data before being combined.

In one or more embodiments of the invention, in response to embedding the image data and one or more RF data in the analog signal, the communication unit (203) is further configured to transmit, via a single physical medium of the communication link (115), the analog signal to the vehicle communication unit (120). In particular, the single physical medium penetrates, through a series of holes (202), the electronics enclosure (215), the bottom (201) of the housing (200), and the fuselage (105) of the vehicle (110, FIG. 1) to connect the communication unit (203) and the vehicle communication unit (120). Collectively transmitting the image data and one or more RF data using a single physical medium advantageously reduces multiple opening sizes of the series of holes (202) in the electronics enclosure (215), the bottom (201), and the fuselage (105).

In one or more embodiments, the analog signal is a single ended signal and the single physical medium is a single conducting wire, such as the center conductor of a coaxial cable. In particular, the single conducting wire is configured to simultaneously transmit at least the first frequency band and the second frequency band of the analog signal. In the embodiments where RF data from both the first antenna (205) and the second antenna (210) are combined with the image data, the single conducting wire simultaneously transmits the first frequency band, the second frequency band, and the third frequency band of the analog signal.

In one or more embodiments, the analog signal is based on differential signaling and the single physical medium is a single pair of conducting wires. Differential signaling is a method for electrically transmitting information using two complementary signals. The technique sends the same electrical signal as a differential pair of signals, each in its own conductor. The pair of conductors may be wires (typically twisted together) or traces on a circuit board. In particular, the single pair of conducting wires is configured to simultaneously transmit at least the first frequency band and the second frequency band of the analog signal. In the embodiments where RF data from both the first antenna (205) and the second antenna (210) are combined with the image data, the single pair of conducting wires simultaneously transmits the first frequency band, the second frequency band, and the third frequency band of the analog signal. Examples of the single pair of conducting wires include a twisted pair cable, a unshielded twisted pair (UTP) cable, etc. The twisted pair cable is a type of wiring in which two conductors of a single circuit are twisted together for the purposes of canceling out electromagnetic interference (EMI) from external sources.

Returning to FIG. 1, as noted above, the vehicle communication unit (120) may include signal modulating and demodulating functionalities that sends and receives analog signals via the communication link (115). For example, the vehicle communication unit (120) may receive data from the processor(s) (125) and generates a modulated analog signal based on the received data. The vehicle communication unit (120) may send the modulated analog signal to the communication assembly (100) via the communication link (115). Similarly, the vehicle communication unit (120) may receive a modulated analog signal from the communication assembly (100) via the communication link (115). The vehicle communication unit (120) may extract data from the modulated analog signal and send it to the processor(s) (125). For example, the vehicle communication unit (120) may demodulate (e.g., using the demodulator (213)) the modulated analog signal to retrieve the image data from the camera module (207) and one or more RF data from the first antenna (205) and/or the second antenna (210). In one or more embodiments, a low pass filter (e.g., low pass filter B (212)) is applied to the modulated analog signal before retrieving the image data. For example, the low pass filter A (208) and the low pass filter B (212) may have similar frequency response characteristics. Accordingly, the image data and one or more RF data are provided, in response to the demodulating, to the electronic control module (ECU (111), FIG. 1) of a vehicle (110, FIG. 1).

Figure 3:
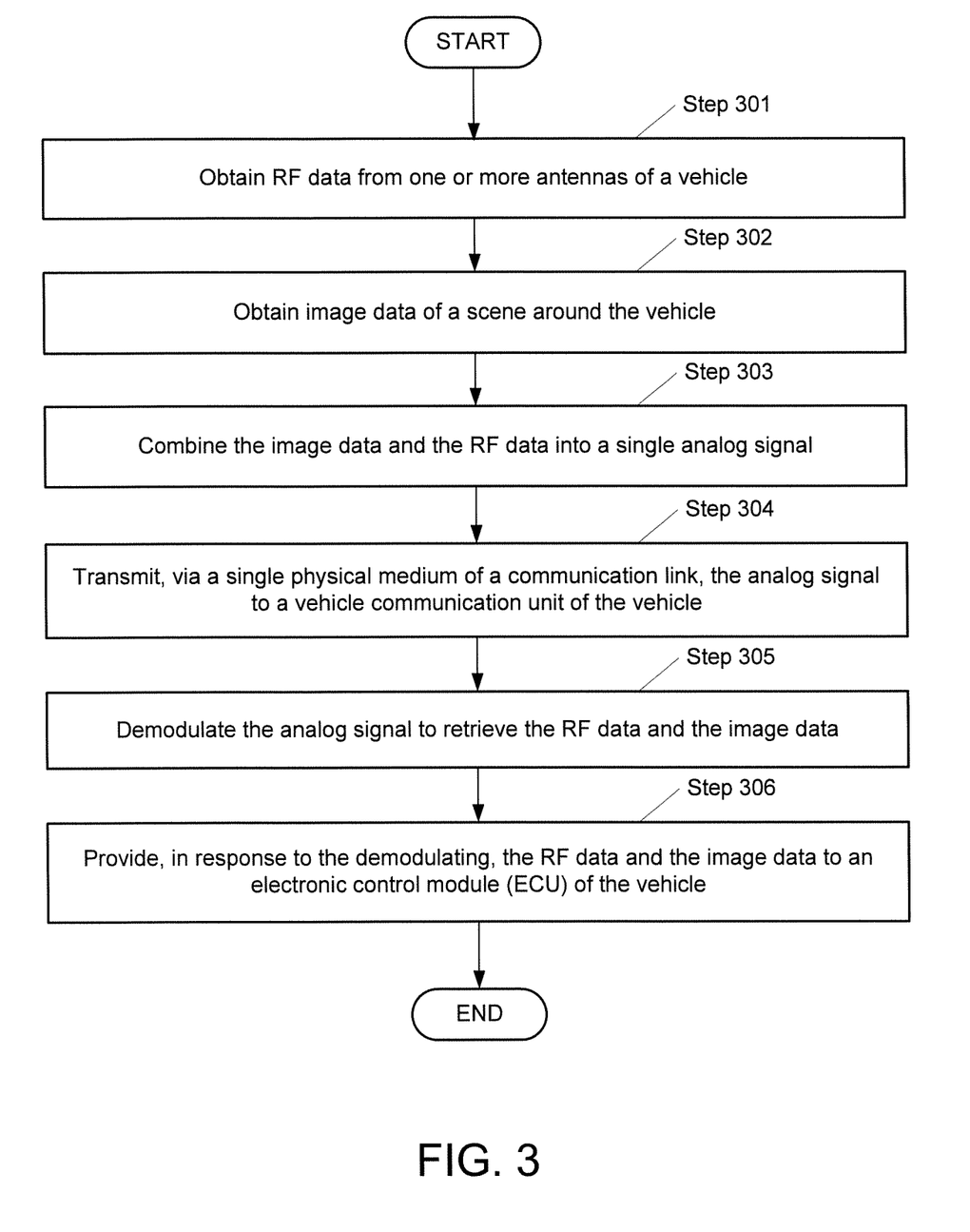
FIG. 3 shows a method in accordance with one or more embodiments of the invention.

FIG. 3 shows a flowchart according to one or more embodiments of the invention. The process shown in FIG. 3 may be executed, for example, by one or more components discussed above in reference to FIGS. 1 and 2 above. One or more steps shown in FIG. 3 may be omitted, repeated, and/or performed in a different order among different embodiments.

Initially in Step 301, RF data is obtained from one or more antennas of a vehicle. In one or more embodiments of the invention, the RF data from each antenna includes a modulated carrier signal. For example, the modulated carrier signal may be in a radio band, a GSM frequency band, an LTE frequency band, etc.

In Step 302, image data of a scene exterior to the vehicle is obtained from a camera module. For example, the image data may be obtained using a video camera. In one or more embodiments of the invention, the image data includes a video feed of the scene.

In Step 303, the image data and the RF data are combined into a single analog signal. In one or more embodiments of the invention, the image data and the RF data are combined using a modulator circuit, such as a quadrature modulator. In particular, the RF data from each antenna is embedded in an individual frequency band of the analog signal. For example, the RF data from a radio antenna may be embedded in the radio band of the analog signal. Similarly, the RF data from a GSM antenna may be embedded in the GSM band of the analog signal.

In one or more embodiments, the image data is embedded in a separate frequency band of the analog signal than the frequency band(s) of the RF data. In the embodiments where the image data includes a video feed, a low pass filter may be applied to the video feed to reduce interference between the video feed and RF data. In one or more embodiments, the image data is embedded in a base band of the analog signal and the low pass filter corresponds to the base band. In other words, from the frequency domain perspective, the low pass filter allows the portion of the video feed within the base band to pass with near zero attenuation (e.g., 0 db or less attenuation) while substantially suppresses (e.g., −3 db or more attenuation) the remaining portion of the video feed having higher frequency than the base band. In one or more embodiments of the invention, the image data and the RF data are combined into the single analog signal based on quadrature modulation. For example, a video feed may be used as a base band signal that is combined with the modulated carrier signal based on quadrature modulation. An example of combining the video feed and RF data is described in reference to FIG. 5 below.

In Step 304, the single analog signal is transmitted, via a single physical medium of a communication link, to a vehicle communication unit of the vehicle. In one or more embodiments of the invention, the single analog signal is transmitted based on singled ended signaling. In other words, the single analog signal is transmitted using a single conducting wire accompanied by a ground return path. In one or more embodiments of the invention, the single analog signal is converted to a pair of complementary signals and transmitted based on differential signaling. In other words, the single analog signal is transmitted using a single pair of conducting wires where each conducting wire transmits one of the two complementary signals in the pair.

In Step 305, the analog signal is demodulated by the vehicle communication unit to retrieve the image data and the RF data from each antenna. In one or more embodiments, a low pass filter may be applied to the analog signal before the demodulation to isolate the base band from the higher frequency bands for the RF data. For example, the low pass filters used in Step 303 and Step 305 may have similar frequency response characteristics.

In Step 306, the image data and the RF data from each antenna are provided, in response to the demodulating, to an electronic control module (ECU) of the vehicle. For example, the ECU may control displaying the image data using a dashboard display of the vehicle. In another example, the ECU may control playing back the RF data using a dashboard radio of the vehicle.

Figure 5:
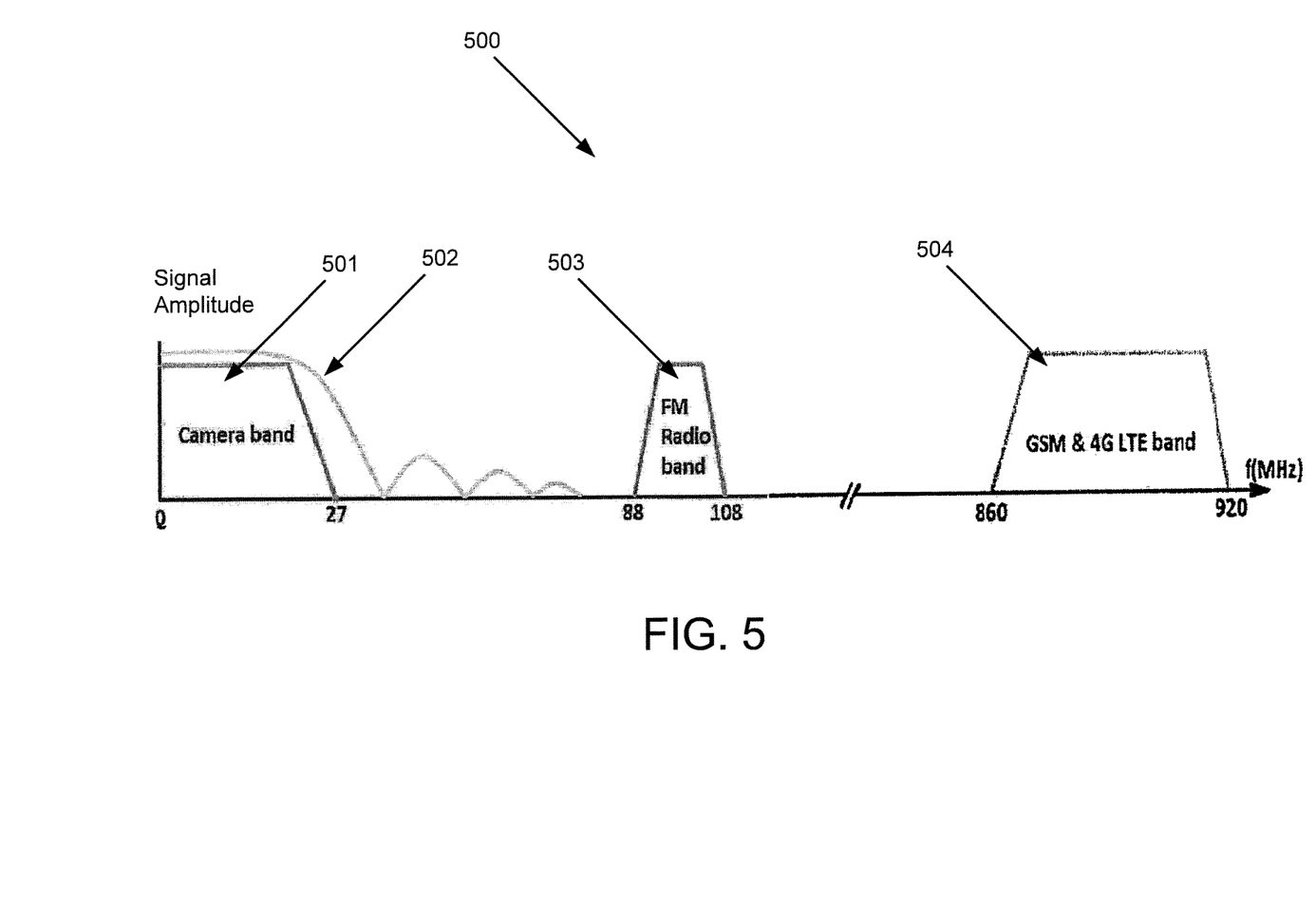

FIGS. 4 and 5 show an example in accordance with one or more embodiments of the invention. The example shown in FIGS. 4 and 5 may be based on one or more components discussed in reference to FIGS. 1, 2, and, 3 above. In one or more embodiments, one or more of the modules and elements shown in FIGS. 4 and 5 may be omitted, repeated, and/or substituted. Accordingly, embodiments of the invention should not be considered limited to the specific arrangements of modules shown in FIGS. 4 and 5.

In particular, FIG. 4 shows a communication assembly (100), depicted in FIGS. 1 and 2 above, that is placed on a roof of a vehicle (180) to capture a 60° rear view (185). The vehicle (180) corresponds to an outline contour of the vehicle (110) depicted schematically in FIG. 1 above. The camera may capture other view angles without departing from the invention. In one or more embodiments of the invention, multiple communication assemblies (100) may be disposed on a fuselage of a vehicle. Each of the communication assemblies (100) may include a camera that generates a view. Due to the placement of each communication assembly (100) and the orientation and type of the camera of each communication assembly (100), each communication assembly may provide a different view. Each of the views provided by each of the communication assemblies (100) may be integrated to form a composite view. In one or more embodiments of the invention, the composite view may include a larger view any than any of the views incorporated into the larger view. In one or more embodiments of the invention, the composite view may include a higher resolution view any than any of the views incorporated into the larger view. In one or more embodiments of the invention, the composite view may include a separate area that highlights an important subview related to a vehicle maneuver and a general area that shows an external view from the vehicle. In one or more embodiments of the invention, the composite view may be a zoomed view of a scene exterior to the vehicle that is set on the basis of a sensor measurement by the vehicle. In one or more embodiments of the invention, the composite view may include a view that would otherwise be occluded from the view of the driver by, for example, the roof or a support structure.

FIG. 5 shows a frequency domain diagram (500) of an example analog signal generated by the communication assembly (100) depicted in FIG. 4 above. As described in reference to FIGS. 1 and 2 above, the analog signal may be transmitted to a vehicle communication unit (120) for providing to the electronic control unit (111) of the vehicle (110). As shown in FIG. 5, the horizontal axis and vertical axis correspond to the frequency (in mega-hertz (Mhz)) and signal amplitude, respectively, of the analog signal in frequency domain. The frequency domain diagram (500) includes a base band (501), a FM radio band (503), a GSM & 4G LTE band (504), and a low pass filter frequency response curve (502). For example, in reference to FIG. 4 above, the base band (501) may correspond to the video feed from a camera module in the communication assembly (100), the FM radio band (503) may correspond to the RF data from a first antenna in the communication assembly (100), and the GSM & 4G LTE band (504) may correspond to the RF data from a second antenna in the communication assembly (100). Further, the low pass filter response curve (502) may correspond to the low pass filter that is applied to the video feed to reduce any interference with the RF data in the FM radio band (503) and GSM & 4G LTE band (504).

As illustrated by the frequency domain diagram (500), the analog signal may be generated from the video feed and the RF data based on quadrature modulation.

Those skilled in the art will appreciate that any suitable frequency range may be used to carry the analog signal. For example, frequencies up to or greater than 1.5 GHz may be used.

One or more embodiments of the invention may provide one or more of the following advantages. A communication assembly in accordance with one or more embodiments of the invention may have a reduced wiring harness for a vehicle. Reducing the wiring harness may reduce the hole sizes in the sheet metal for harnessing the vehicle. The communication assembly may have a reduced number of external electrical connections by utilizing a single physical medium of a communication link that transmits data from a camera module and a RF module. Reducing the wiring harness and the number of external connections may reduce the cost of the communication assembly.

A communication assembly in accordance with one or more embodiments of the invention may employ less electromagnetic shielding due to the integration of a camera video cable and one or more antenna RF cables into a single coax cable or single twisted pair of conducting wires. Potential interference between the video feed signal and the RF signals are mitigated using low pass filter(s) instead of physical electromagnetic shielding material.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A communication assembly disposed on a fuselage of a vehicle, comprising:
    a radio frequency (RF) receiver that receives first RF data from a first antenna of a vehicle;
    a camera that obtains image data of a scene exterior to the vehicle; and
    a processor, operatively connected to the RF receiver and the camera, configured to:
        embed the first RF data in a first frequency band of an analog signal,
        embed the image data in a second frequency band of the analog signal, and
        transmit, via a single physical medium communication link, the analog signal to a vehicle processor of the vehicle,
    wherein the vehicle processor is configured to demodulate the analog signal to retrieve the first RF data and the image data,
    wherein the first RF data and the image data are provided, in response to the demodulating, to an electronic control module (ECU) of the vehicle,
    wherein the single physical medium comprises a single conducting wire configured to simultaneously transmit the first frequency band and the second frequency band of the analog signal, and
    wherein the single physical medium penetrates through the fuselage of the vehicle to connect the communication assembly to the vehicle processor.

2. The communication assembly of claim 1,
    wherein the single physical medium comprises a twisted pair of conducting wires for differential signaling and configured to simultaneously transmit the first frequency band and the second frequency band of the analog signal.

3. The communication assembly of claim 1,
wherein the RF receiver obtains second RF data from a second antenna,
wherein the processor is further configured to embed the second RF data in a third frequency band of the analog signal,
wherein the vehicle processor is further configured to further demodulate the analog signal to retrieve the second RF data, and
wherein the second RF data is provided, in response to the further demodulating, to the ECU.

4. The communication assembly of claim 1, wherein the image data comprises a video feed of the scene.

5. The communication assembly of claim 4, wherein the second frequency band comprises a base band.

6. The communication assembly of claim 4,
wherein embedding the image data comprises applying a first low pass filter to the video feed, and
wherein retrieving the image data comprises applying a second low pass filter to the analog signal.

7. The communication assembly of claim 4, wherein the RF data and the video feed are embedded in the analog signal based on quadrature modulation.

8. A method of communication for a vehicle, comprising:
obtaining first RF data from a first antenna of the vehicle;
obtaining, by a camera, image data of a scene around the vehicle;
embedding the first RF data in a first frequency band of an analog signal;
embedding the image data in a second frequency band of the analog signal; and
transmitting, via a single physical medium of a communication link, the analog signal to a vehicle processor of the vehicle,
wherein the vehicle processor is configured to demodulate the analog signal to retrieve the first RF data and the image data,
wherein the first RF data and the image data are provided, in response to the demodulating, to an electronic control module (ECU) of the vehicle,
wherein the single physical medium is a single conducting wire configured to simultaneously transmit the first frequency band and the second frequency band of the analog signal,
wherein the first antenna and the camera are disposed on a fuselage of the vehicle, and
wherein the single physical medium penetrates through the fuselage of the vehicle and is connected to the vehicle processor.

9. The method of claim 8, obtaining second RF data from a second antenna; and
embedding the second RF data in a third frequency band of the analog signal,
wherein the vehicle processor is further configured to further demodulate the analog signal to retrieve the second RF data, and
wherein the second RF data is provided, in response to the further demodulating, to the ECU.

10. The method of claim 8, wherein the image data comprises a video feed of the scene.

11. The method of claim 8, wherein the second frequency band comprises a base band.

12. The method of claim 8,
wherein embedding the image data comprises applying a first low pass filter to the video feed, and
wherein retrieving the image data comprises applying a second low pass filter to the analog signal.

13. The method of claim 8, wherein the RF data and the video feed are embedded in the analog signal based on quadrature modulation.

* * * * *